US012142191B2

(12) United States Patent
Cao et al.

(10) Patent No.: US 12,142,191 B2
(45) Date of Patent: Nov. 12, 2024

(54) DRIVING CIRCUIT, DRIVING METHOD THEREOF, AND DISPLAY DEVICE

(71) Applicant: WUHAN CHINA STAR OPTOELECTRONICS TECHNOLOGY CO., LTD., Wuhan (CN)

(72) Inventors: Haiming Cao, Wuhan (CN); Yanqing Guan, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/260,994

(22) PCT Filed: Sep. 11, 2020

(86) PCT No.: PCT/CN2020/114817
§ 371 (c)(1),
(2) Date: May 8, 2023

(87) PCT Pub. No.: WO2022/041330
PCT Pub. Date: Mar. 3, 2022

(65) Prior Publication Data

US 2023/0274688 A1 Aug. 31, 2023

(30) Foreign Application Priority Data

Aug. 27, 2020 (CN) ......................... 202010879262.5

(51) Int. Cl.
*G09G 3/32* (2016.01)

(52) U.S. Cl.
CPC ....... *G09G 3/32* (2013.01); *G09G 2300/0842* (2013.01); *G09G 2320/0214* (2013.01); (Continued)

(58) Field of Classification Search
CPC ...... G09G 3/32; G09G 3/3659; G09G 3/3674; G09G 2310/02; G09G 2310/0202; G09G 2310/021
See application file for complete search history.

(56) References Cited

U.S. PATENT DOCUMENTS

2008/0094320 A1 4/2008 Parikh et al.
2012/0161637 A1 6/2012 Lee et al.
(Continued)

FOREIGN PATENT DOCUMENTS

CN 101937647 A 1/2011
CN 102314832 A 1/2012
(Continued)

OTHER PUBLICATIONS

International Search Report in International application No. PCT/CN2020/114817,mailed on Jun. 2, 2021.
(Continued)

*Primary Examiner* — Kevin M Nguyen
(74) *Attorney, Agent, or Firm* — PV IP PC; Wei Te Chung

(57) ABSTRACT

A driving circuit, a driving method thereof, and a display device are provided, including making a first switch connected to a gate of a driving transistor be in a first state during a previous frame, and be in a second state in a current frame, and making a second switch in series with the first switch be in the second state in the previous frame, and be in the first state in the current frame, wherein the first state is one of a conducting-and-cut-off switching state or a constantly conducting state, and the second state is the other of the conducting-and-cut-off switching state or the constantly conducting state.

20 Claims, 6 Drawing Sheets

(52) U.S. Cl.
CPC ............... *G09G 2320/0233* (2013.01); *G09G 2330/021* (2013.01)

(56) References Cited

U.S. PATENT DOCUMENTS

| | | | |
|---|---|---|---|
| 2014/0321599 | A1 | 10/2014 | Cho et al. |
| 2020/0152118 | A1* | 5/2020 | Xu ......................... G09G 3/325 |
| 2021/0057502 | A1* | 2/2021 | Kim .................... H01L 27/1251 |

FOREIGN PATENT DOCUMENTS

| | | | |
|---|---|---|---|
| CN | 106611586 | A | 5/2017 |
| CN | 107230452 | A | 10/2017 |
| CN | 107316613 | A | 11/2017 |
| CN | 108630158 | A | 10/2018 |
| JP | 2010139897 | A | 6/2010 |
| KR | 20140093547 | A | 7/2014 |
| KR | 20190046138 | A | 5/2019 |

OTHER PUBLICATIONS

Written Opinion of the International Search Authority in International application No. PCT/CN2020/114817,mailed on Jun. 2, 2021.

Chinese Office Action issued in corresponding Chinese Patent Application No. 202010879262.5 dated May 8, 2021, pp. 1-9.

* cited by examiner

DRIVING CIRCUIT, DRIVING METHOD THEREOF, AND DISPLAY DEVICE

RELATED APPLICATIONS

This application is a Notional Phase of PCT Patent Application No. PCT/CN2020/114817 having international filing date of Sep. 11, 2020, which claims the benefit of priority of Chinese Patent Application No. 202010879262.5 filed on Aug. 27, 2020. The contents of the above applications are all incorporated by reference as if fully set forth herein in their entirety.

FIELD OF INVENTION

The present application relates to the field of display technology, and especially to a driving circuit, a driving method thereof, and a display device.

BACKGROUND OF INVENTION

With development of display technology, users' demands on display requirements have become increasingly higher. A smoother display quality of high-frequency dynamic picture display is required, while a demand for low-power ordinary display also needs to be met. In response to the need of high-frequency display and ordinary display, dynamic frame frequency technology has emerged. For display panels that simultaneously satisfy ultra low frequency (1 Hz-5 Hz) and ultra high frequency (120 Hz-360 Hz), it is required for pixel circuits in a display area to have features of a strong charging capacity and a strong picture maintenance capacity. Wherein, the strong charging capacity means that each row of the pixel circuits has a very short charging time under high-frequency state, and the strong picture maintenance capacity means lengthened time duration of each frame under low-frequency state. Conventional amorphous silicon technology, low temperature polysilicon technology, and metal oxide technology cannot simultaneously satisfy requirements of ultra low frequency and ultra high frequency display.

Low temperature polycrystalline oxide (LTPO) technology combines advantages of two technologies of low temperature poly-silicon (LTPS) and indium gallium zinc oxide (IGZO), making a display panel simultaneously be equipped with features of strong driving capacity and low power consumption, and it has become a popular technology in display field. Currently, LTPO technology is gradually applied to low-frequency and high-frequency display field. Wherein, for a pixel circuit design of low-frequency display, a feature of very low off-state leakage current of metal oxide transistors is generally taken, and by making a transistor connected to a gate of a driving transistor have a metal oxide active layer, a purpose of maintaining a gate voltage level of the driving transistor under low-frequency state is realized. However, metal oxide transistors have a worse performance against negative-bias temperature stress, and a transistor connected to a gate of a driving transistor that has a metal oxide active layer is often in an off state. The off-state transistor having the metal oxide active layer is under the effect of negative-bias temperature stress, leading to threshold voltage negative drift of the transistor having the metal oxide active layer, and the threshold voltage negative drift easily leads to electrical leakage of the gate of the driving transistor, finally leading to low-frequency display failure.

Therefore, it is necessary to provide a technical approach to solve a problem that when a metal oxide transistor is in an off state and under the effect of negative-bias temperature stress, the threshold voltage negatively drifts, which leads to electrical leakage of a gate of a driving transistor, leading to low-frequency display failure.

SUMMARY OF INVENTION

Technical Problem

The present application is to provide a driving circuit, a driving method thereof, and a display device to solve a problem that when metal oxide transistors are under negative-bias temperature stress in an off state, threshold voltage negatively drifts, which leads to electrical leakage of a gate of a driving transistor, leading to low-frequency display failure.

Solution to Problem

Technical Solution

In order to realize the above-mentioned purpose, the present application provides a driving circuit that includes:

a light-emitting diode;

a driving transistor electrically connected to the light-emitting diode and configured to provide driving current to the light-emitting diode;

a first switch connected to a gate of the driving transistor, being in a first state during a previous frame, and being in a second state during a current frame; and a second switch, wherein the first switch is connected between the gate of the driving transistor and the second switch, and the second switch is in the second state during the previous frame, and is in the first state during the current frame;

wherein the first state is one of a conducting-and-cut-off switching state or a constant conducting state, and the second state is the other of the conducting-and-cut-off switching state or the constant conducting state.

In the above-described driving circuit, the first switch and the second switch both comprise a transistor with a metal oxide active layer.

In the above-described driving circuit, the driving circuit further includes:

a first initialization switch connected to an anode of the light-emitting diode, being in the first state during the previous frame, and being in the second state during the current frame; and a second initialization switch connected between an initialization signal line and the first initialization switch, wherein the first initialization switch is connected between the second initialization switch and the anode of the light-emitting diode, and the second initialization switch is in the second state during the previous frame, and is in the first state during the current frame.

In the above-described driving circuit, the first initialization switch and the second initialization switch both comprise a transistor with a metal oxide active layer.

In the above-described driving circuit, the driving circuit further includes a capacitor, wherein one terminal of the capacitor is connected to the gate of the driving transistor, and the other terminal of the capacitor is connected to the anode of the light-emitting diode and the first initialization switch.

In the above-described driving circuit, the driving circuit further includes:

- a first writing switch connected to one of a source or a drain of the driving transistor, being in the first state during the previous frame, and being in the second state during the current frame; and
- a second writing switch connected between the first writing switch and a data line, wherein the first writing switch is connected between the second writing switch and one of the source or the drain of the driving transistor, and the second writing switch is in the second state during the previous frame, and is in the first state during the current frame.

In the above-described driving circuit, the first writing switch and the second writing switch both comprise a transistor with a metal oxide active layer.

In the above-described driving circuit, the second switch is connected between the first switch and the other of the source and the drain of the driving transistor.

In the above-described driving circuit, the driving circuit further includes:

- a first light-emitting control transistor connected between one of a source or a drain of the driving transistor and an anode of the light-emitting diode; and
- a second light-emitting control transistor connected between the other of the source or the drain of the driving transistor and a power signal line.

In the above-described driving circuit, the driving transistor, the first light-emitting control transistor, and the second light-emitting control transistor are a transistor with a poly-silicon active layer.

In the above-described driving circuit, the second switch is connected between a data line and the first switch.

In the above-described driving circuit, the conducting-and-cut-off switching state includes a conducting state and a cut-off state, and a time duration of the conducting state is less than a time duration of the cut-off state in the conducting-and-cut-off switching state.

A driving method of the above-described driving circuit that includes following steps:

- during the previous frame, the first switch being in the first state, and the second switch being in the second state; and
- during the current frame, the first switch being in the second state, and the second switch being in the first state.

A display device that includes the above-described driving circuit.

Advantageous Effect

The present application provides a driving circuit, a driving method thereof, and a display device. Through making a first switch connected to a gate of a driving transistor be in a first state during a previous frame, and be in a second state in a current frame, and making a second switch in series with the first switch be in the second state in the previous frame, and be in the first state in the current frame, wherein the first state is one of a conducting-and-cut-off switching state or a constant conducting state, and the second state is the other of the conducting-and-cut-off switching state or the constant conducting state, the first switch and the second switch are both alternately under negative-bias temperature stress due to frequently being in a cut-off state in the conducting-and-cut-off switching state, and under positive-bias temperature stress due to constantly conducting. By using a feature that when applying positive-bias temperature stress to a metal oxide transistor after it is under negative-bias temperature stress, or applying negative-bias temperature stress after it is under positive-bias temperature stress, threshold voltage of the metal oxide transistor will resume, threshold voltage drift of the first switch and the second switch is prevented, increasing stability of the first switch and the second switch, preventing the gate of the driving transistor from electrical leakage due to instability which leads to low-frequency display failure problem, and solving a problem that conventionally, the transistor connected to the gate of the driving transistor is usually in an off state, leading to threshold voltage negative drift which leads to electrical leakage of the gate of the driving transistor that leads to low-frequency display failure. Furthermore, the first switch and the second switch are alternately under the conducting-and-cut-off switching state, preventing crosstalk of a signal written into the gate of the driving transistor.

DETAILED DESCRIPTION OF PREFERRED EMBODIMENTS

Figure 1A:
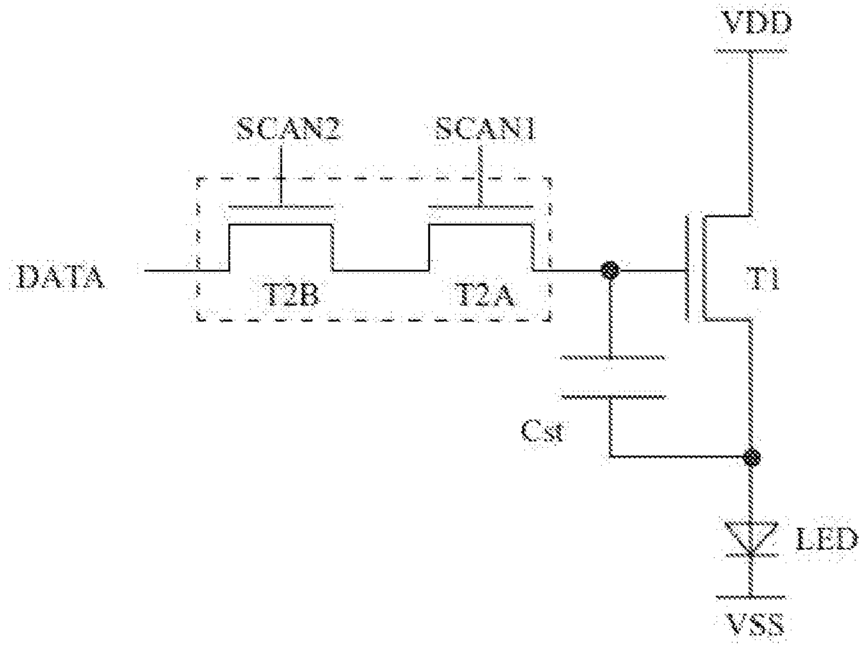
FIG. 1A is an equivalent circuit diagram of a driving circuit according to a first embodiment of the present application.

For better clearness and definiteness of purpose, technical approach, and effect of the present application, the following further describes embodiments of the present application in detail with reference to accompanying drawings. It should be understood that the embodiments described here is merely for explaining the present application and not intended to limit the present application.

The present application provides a display device that can include an organic light-emitting diode (LED) display panel, wherein the organic light-emitting diode display panel includes a plurality of organic light-emitting diodes. The display device can also include a display panel that uses micro LEDs as display pixels, wherein the micro LEDs are inorganic light-emitting diodes having sizes less than or equal to 50 micrometers. The display device can also include a backlight module that uses mini LEDs as light-emitting units, wherein the mini LEDs are inorganic light-emitting diodes having sizes ranged between 50-200 micrometers.

In order to make the display device emit light for display, the display device includes a plurality of driving circuits arranged in an array. The driving circuits include light-emitting diodes and driving transistors, the driving transistors are electrically connected to the light-emitting diodes, and the driving transistors are configured to provide driving currents to the light-emitting diodes. In the process when the driving transistors drive the light-emitting diodes to emit light, a stable electric potential of a gate of the driving transistors facilitates improving light-emitting effect of the light-emitting diodes. Particularly, during a low frequency display, sustaining a stable electric potential of the gate of the driving transistors for a longer time is required to allow the light-emitting diodes to emit light stably.

The driving circuit can be applied to an organic light-emitting diode display panel and a display panel that uses micro LEDs as display pixels, and, through controlling magnitude of the driving current (pulse amplitude modulation) or time duration of the light-emitting diodes receiving the driving current (pulse width modulation), can control the light-emitting diodes to emit light with a corresponding greyscale, such that the display device displays different greyscales. The driving circuit can also be applied to a backlight module that uses mini LEDs as backlight light-emitting units, through controlling the magnitude of the driving current and the time duration of driving current, controls backlight brightness emitted by the backlight module, and, through controlling brightness of the mini LEDs by area, regulates the backlight brightness by area, thereby realizing increasing of display contrast and decreasing of power consumption.

For facilitating description of technical approach of the present application, the following illustrates a driving circuit that is applied to a display panel to realize light-emitting display.

FIG. 1A is an equivalent circuit diagram of a driving circuit according to a first embodiment of the present application. The driving circuit includes a driving transistor T1, a first switch T2A, a second switch T2B, a capacitor Cst, and a light-emitting diode LED.

The light-emitting diode LED includes an anode and a cathode, the cathode of the light-emitting diode LED is connected to a first power signal line VSS, and the anode of the light-emitting diode LED is connected to a source of the driving transistor T1. The light-emitting diode LED is configured to receive driving current to emit light. The first power signal line VSS inputs a first power signal. The light-emitting diode LED is chosen from any one of an organic light-emitting diode, a mini LED, and a micro LED. Specifically, the light-emitting diode LED is an organic light-emitting diode.

The driving transistor T1 has a low temperature poly-silicon active layer. The driving transistor is an n-type transistor. A gate of the driving transistor T1 is connected to the first switch T2A and a first terminal of the capacitor Cst, a source of the driving transistor T1 is connected to a second terminal of the capacitor Cst and the anode of the light-emitting diode LED, and a drain of the driving transistor T1 is connected to a second power signal line VDD. The second power signal line VDD is configured to input a second power signal. The turned-on driving transistor T1 outputs the driving current to the anode of the light-emitting diode LED. In other embodiments, the driving transistor T1 can also be a p-type transistor.

One terminal of the capacitor Cst is connected to the gate of the driving transistor T1, and the other terminal of the capacitor Cst is connected to the anode of the light-emitting diode LED. The capacitor Cst is configured to maintain voltage of the gate of the driving transistor T1 to ensure that the light-emitting diode LED emits light during a frame.

The first switch T2A is connected to the gate of the driving transistor T1, and the first switch T2A is connected between the gate of the driving transistor T1 and the second switch T2B. The second switch T2B is connected between a data line DATA and the first switch T2A. The first switch T2A and the second switch T2B as a whole concurrently control a data signal input by the data line DATA to write into the gate of the driving transistor T1 or not.

The first switch T2A and the second switch T2B both include a transistor having a metal oxide active layer and they are both an n-type transistor. A source of the first switch T2A is connected to the gate of the driving transistor T1, a drain of the first switch T2A is connected to a source of the second switch T2B, and a gate of the first switch T2A is connected to a first scan signal line SCAN1. A gate of the second switch T2B is connected to a second scan signal line SCAN2, the source of the second switch T2B is connected to the drain of the first switch T2A, and a drain of the second switch T2B is connected to the data line DATA.

The first switch T2A and the second switch T2B both include a transistor having a metal oxide active layer and they are both an n-type transistor, such that, during the process that the driving transistor T1 drives the light-emitting diode LED to emit light, the first switch T2A and the second switch T2B both have a lower off-state leakage current, to prevent an electric potential change of the gate of the driving transistor T1 that leads to abnormal display of the light-emitting diode LED during that process.

The first switch T2A is in a first state during a previous frame F1, and is in a second state during a current frame F2. The second switch T2B is in the second state during the previous frame F1, and is in the first state during the current frame F2. The first state is one of a conducting-and-cut-off switching state or a constant conducting state, and the second state is the other of the conducting-and-cut-off switching state or the constant conducting state. Time duration of the previous frame F1 is identical to that of the current frame F2. One of the first switch T2A or the second switch T2B is in the conducting-and-cut-off switching state during a same frame, and the other is in the constant conducting state, to control the data signal of the frame to write into the gate of the driving transistor T1 or not.

When the first switch T2A is in the conducting-and-cut-off switching state in a frame, the first switch T2A is in a conducting state during part of the frame, and in a cut-off state during part of the frame, and the first switch T2A switches between the conducting state and the cut-off state. A time that the data signal input by the data signal line DATA is written into the gate of the driving transistor T1 is short, and therefore a conducting time of the first switch T2A in the conducting-and-cut-off switching state is short. For example, a time duration of a frame is 16667 microseconds ($1/60$ s), there are 2433 rows of driving circuits, and a conducting time of each row of the driving circuits is 6.85 microseconds, that is, when scan frequency is 60 Hz, during a frame (16667 microseconds), a time that the first switch T2A and the second switch T2B simultaneously conduct for writing the data signal is 6.85 microseconds, and most of the rest of time the first switch T2A is in the cut-off state. When the first switch T2A is in the constant conducting state, the first switch T2A is always in the conducting state. Behavior of the second switch T2B in the conducting-and-cut-off switching state and the constant conducting state is the same as that of the first switch T2A, and detailed description is omitted here.

Metal oxide transistors are under negative-bias temperature stress during the cut-off state, and they are under positive-bias temperature stress during the conducting state. When a frame is in the conducting-and-cut-off switching state, a conducting time of the first switch T2A and the second switch T2B is less than their cut-off time, leading to a longer negative-bias temperature stress time of the first switch T2A and the second switch T2B in a frame, and negative drift of threshold voltage of the first switch T2A and the second switch T2B when they are in a frame of the conducting-and-cut-off switching state. Through making the first switch T2A and the second switch T2B be in the constant conducting state in another frame, the first switch T2A and the second switch T2B can be under positive-bias temperature stress in another frame. A time of the first switch T2A being under negative-bias temperature stress in one frame is similar to that being under positive-bias temperature stress in another frame, preventing threshold voltage of the first switch T2A from drifting. A time of the second switch T2B being under negative-bias temperature stress in one frame is similar to that being under positive-bias temperature stress in another frame, preventing threshold voltage of the second switch T2B from drifting. Therefore, the first switch T2A and the second switch T2B have satisfactory stability, preventing threshold voltage of the first switch T2A and the second switch T2B from negatively drifting, which leads to electrical leakage of the gate of the driving transistor, thereby preventing low-frequency display failure, facilitating realization of better stability, lower power consumption, and better visual experience.

Specifically, the first switch T2A is in the constant conducting state in the previous frame, and in the conducting-and-cut-off switching state in the current frame. The second switch T2B is in the conducting-and-cut-off switching state in the previous frame, and in the constant conducting state in the current frame, to prevent threshold voltage of the first switch T2A and the second switch T2B from drifting. One of the first switch T2A or the second switch T2B is separately used as a switch in the previous frame and the current frame, preventing crosstalk of the data signal written into the gate of the driving transistor.

Figure 1B:
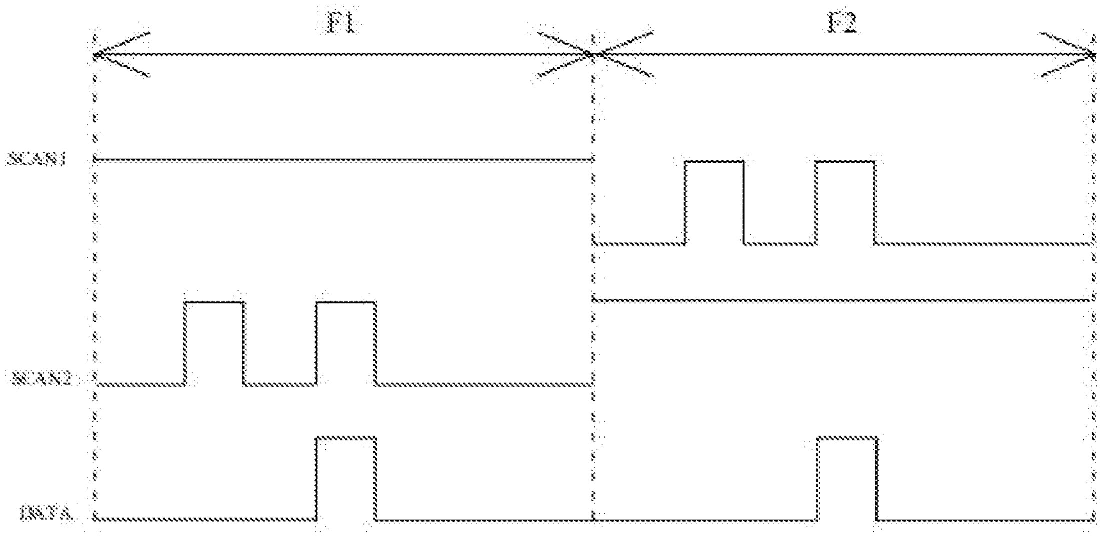
FIG. 1B is a timing diagram corresponding to the equivalent circuit diagram of the driving circuit according to the first embodiment of the present application.

FIG. 1B is a timing diagram corresponding to the equivalent circuit diagram of the driving circuit according to the first embodiment of the present application. During the previous frame, the first switch T2A is in the first state, and the second switch T2B is in the second state. During the current frame, the first switch T2A is in the second state, and the second switch T2B is in the first state.

In the present embodiment, during the previous frame F1, the first scan signal line SCAN1 constantly inputs a first scan signal at a high electrical level, and the first switch T2A is in the constant conducting state. The second scan signal line SCAN2 inputs a second scan signal at the high electrical level at two time slots while inputs the second scan signal at a low electrical level during the rest of the frame, and the second switch T2B is in the conducting-and-cut-off switching state. At a time slot that the second scan signal line SCAN2 writes the high electrical level, the data line DATA writes the data signal into the gate of the driving transistor T1. During the current frame F2, the first scan signal line SCAN1 inputs the first scan signal at the high electrical level at two time slots while inputs the first scan signal at the low electrical level during the rest of the frame, and the first switch T2A is in the conducting-and-cut-off switching state. At a time slot that the first scan signal line SCAN1 writes the high electrical level, the data line DATA writes the data signal. The second scan signal line SCAN2 constantly inputs the second scan signal at the high electrical level, and the second switch T2B is in the constant conducting state.

Figure 2A:
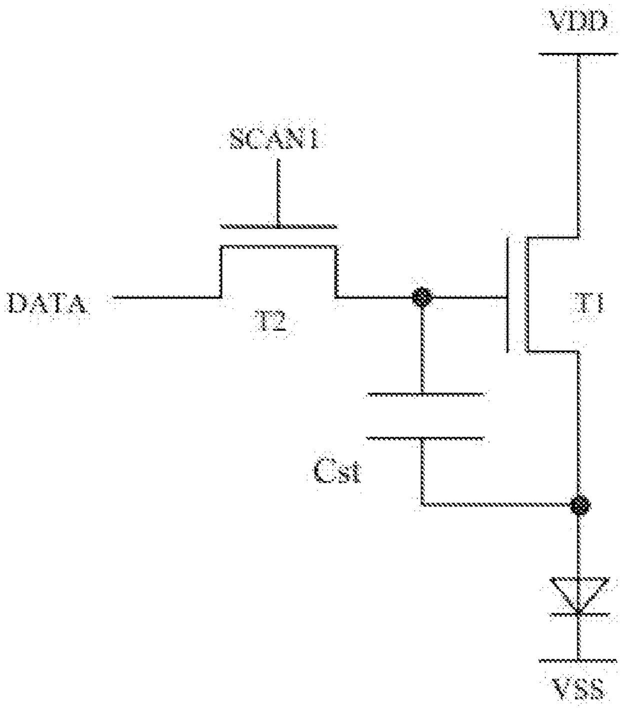
FIG. 2A is an equivalent circuit diagram of a driving circuit according to a first comparison example.
Figure 2B:
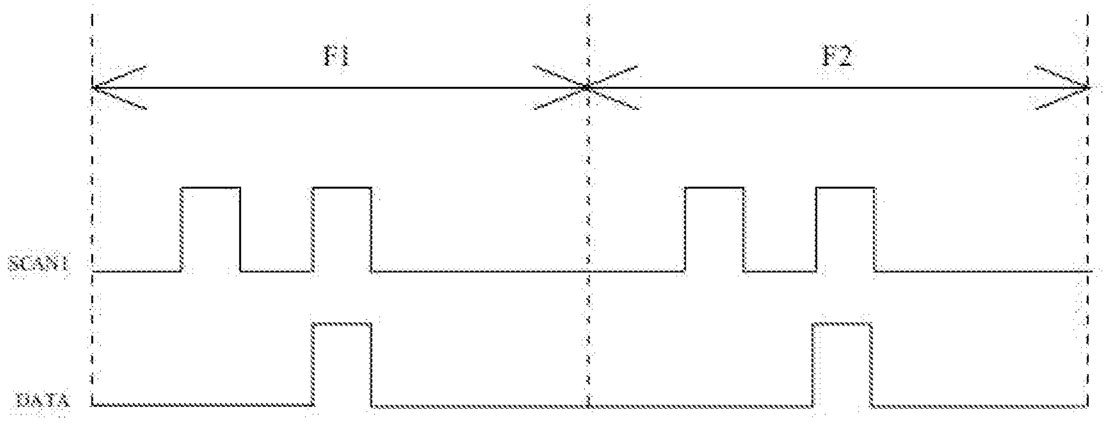
FIG. 2B is a timing diagram corresponding to the equivalent circuit diagram of the driving circuit according to the first comparison example.

Referring to FIGS. 2A and 2B, FIG. 2A is an equivalent circuit diagram of a driving circuit according to a first comparison example. FIG. 2B is a timing diagram corresponding to the equivalent circuit diagram of the driving circuit according to the first comparison example. The driving circuit as shown in FIG. 2A includes a driving transistor T1, a switch transistor T2, a capacitor Cst, and a light-emitting diode LED.

The driving transistor T1 is an n-type transistor and has a low temperature poly-silicon active layer. The switch transistor T2 is an n-type transistor and has a metal oxide active layer. An anode of the light-emitting diode LED is connected to a source of the driving transistor T1, and a cathode of the light-emitting diode LED is connected to a first power signal line VSS. A gate of the driving transistor T1 is connected to a source of the switch transistor T2 and one terminal of the capacitor Cst, a drain of the driving transistor T1 is connected to a second power signal line VDD, and the source of the driving transistor T1 is connected to the anode of the light-emitting diode LED and the other terminal of the capacitor Cst. A gate of the switch transistor T2 is connected to a first scan signal line SCAN1, a drain of the switch transistor T2 is connected to a data line DATA, and the source of the switch transistor T2 is connected to the gate of the driving transistor T1 and the one terminal of the capacitor Cst. The one terminal of the capacitor Cst is connected to the gate of the driving transistor T1 and the source of the switch transistor T2, and the other terminal of the capacitor Cst is connected to the source of the driving transistor T1 and the anode of the light-emitting diode LED.

It can be seen from FIG. 2B that during most time in each frame, the switch transistor T2 is in cut-off state, leading to the switch transistor T2 being constantly under an effect of negative-bias temperature stress. Because metal oxide transistors perform worse under negative-bias temperature stress, threshold voltage of the switch transistor T2 negatively drifts, leading to electrical leakage of the gate of the driving transistor T1, thereby leading to low-frequency display failure.

Figure 3A:
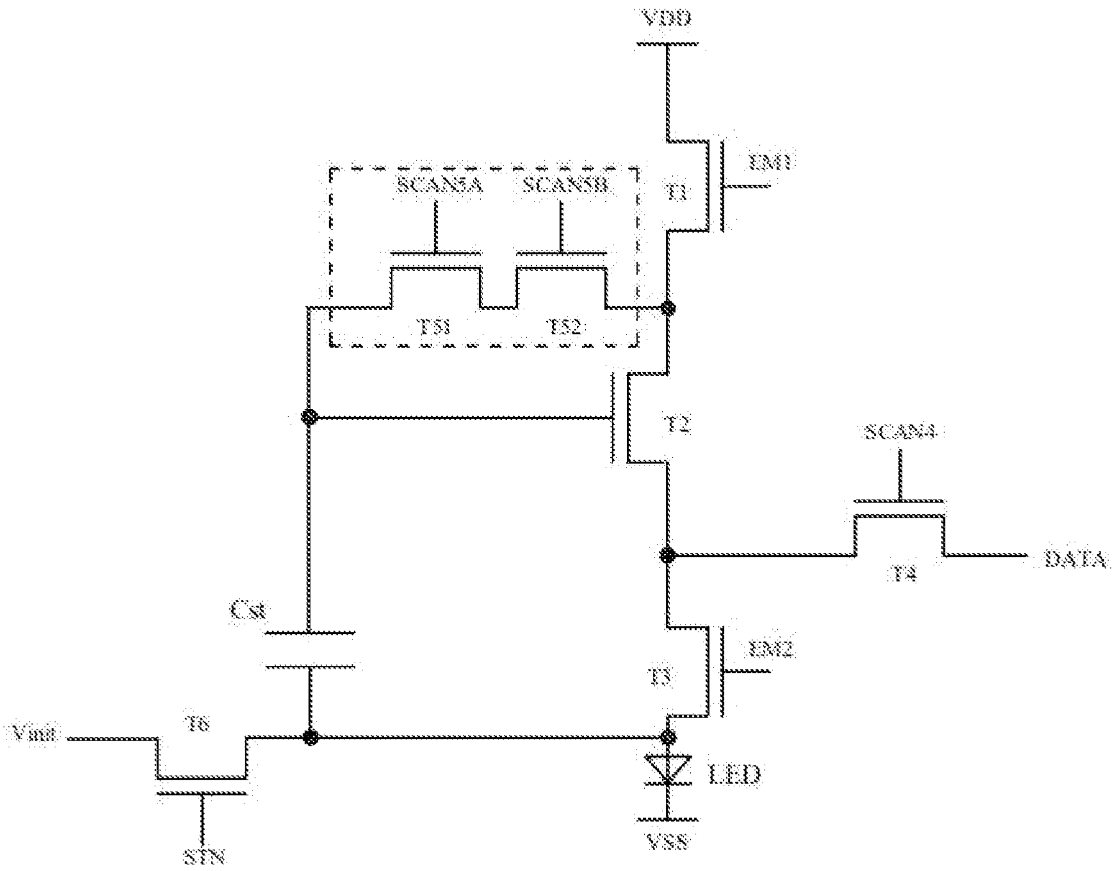
FIG. 3A is an equivalent circuit diagram of the driving circuit according to a second embodiment of the present application.
Figure 3B:
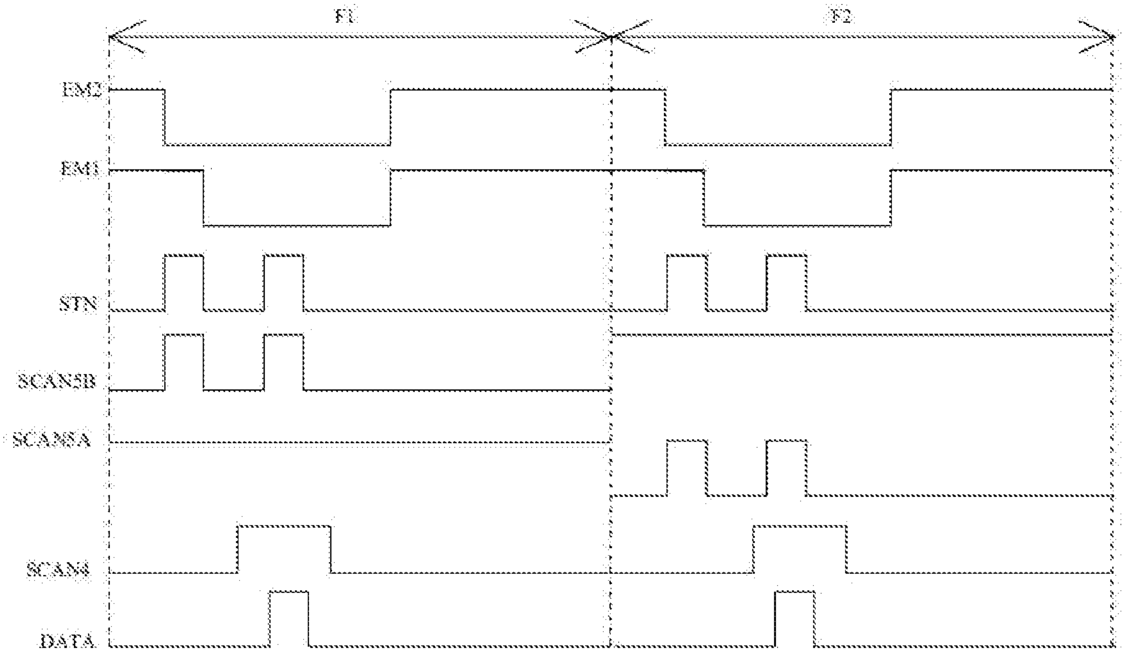
FIG. 3B is a timing diagram corresponding to the equivalent circuit diagram of the driving circuit according to the second embodiment of the present application.

Referring to FIG. 3A and FIG. 3B, FIG. 3A is an equivalent circuit diagram of the driving circuit according to a second embodiment of the present application. FIG. 3B is a timing diagram corresponding to the equivalent circuit diagram of the driving circuit according to the second embodiment of the present application. The driving circuit includes a second light-emitting control transistor T1, a driving transistor T2, a first light-emitting control transistor T3, a writing switch T4, a compensation switch, an initialization switch T6, a capacitor Cst, and a light-emitting diode LED. Wherein, the light-emitting diode LED is the same as the light-emitting diode LED in the driving circuit according to the first embodiment, and detailed description is omitted here.

The compensation switch is connected between one of a drain or a source of the driving transistor T2 and a gate of the driving transistor T2, electrically connecting the gate of the driving transistor T2 and one of the drain or the source of the driving transistor T2. The compensation switch includes a first switch T51 and a second switch T52. The first switch T51 is connected to the gate of the driving transistor T2 and one terminal of the capacitor Cst, the first switch T51 is connected between the gate of the driving transistor T2 and the second switch T52, and the second switch T52 is connected between the first switch T51 and one of the drain or the source of the driving transistor T2. A gate of the first switch T51 is connected to a fifth scan signal line SCAN5A, and the fifth scan signal line SCAN5A is configured to input a fifth scan signal. A gate of the second switch T52 is connected to a sixth scan signal line SCAN5B, and the sixth scan signal line SCAN5B is configured to input a sixth scan signal. The first switch T51 and the second switch T52 as a whole control electrical connection between the gate of the driving transistor T2 and one of the source or the drain of the driving transistor T2.

Specifically, the driving transistor T2 is an n-type transistor and has a low temperature poly-silicon active layer. The first switch T51 and the second switch T52 are an n-type transistor and have a metal oxide active layer. The second switch T52 is connected between the drain of the driving transistor T2 and the first switch T51. In other embodiments, the first switch T51 and the second switch T52 can also be a p-type transistor.

The first light-emitting control transistor T3 and the second light-emitting control transistor T1 are an n-type transistor and have a low temperature poly-silicon active layer. The first light-emitting control transistor T3 is connected between the source of the driving transistor T2 and an anode of the light-emitting diode LED, a gate of the first light-emitting control transistor T3 is connected to a second light-emitting control signal line EM2, the second light-emitting control signal line EM2 is configured to input a second light-emitting control signal, and the first light-emitting control transistor T3 is configured to output driving current output by the driving transistor T2 to the anode of the light-emitting diode according to the second light-emitting control signal. The second light-emitting control transistor T1 is connected between the drain of the driving transistor T2 and a second power signal line VDD, a gate of the second light-emitting control transistor T1 is connected to a first light-emitting control signal line EM1, the first light-emitting control signal line EM1 is configured to input a first light-emitting control signal, the second light-emitting control transistor T1 is configured to output the second power signal to the drain of the driving transistor T2. The light-emitting diode LED is connected between the first light-emitting control transistor T3 and a first power signal line VSS.

The writing switch T4 is an n-type transistor and has a low temperature poly-silicon active layer. A source of the writing switch T4 is connected to the source of the driving transistor T2, a drain of the writing switch T4 is connected to a data line DATA, the data line DATA is configured to input a data signal, a gate of the writing switch T4 is connected to a fourth scan signal line SCAN4, and the fourth scan signal line SCAN4 is configured to input a fourth scan signal. The writing switch T4 is configured to write in the data signal to the source of the driving transistor T2 according to the fourth scan signal.

The initialization switch T6 is an n-type transistor and has a low temperature poly-silicon active layer. A gate of the initialization switch T6 is connected to a seventh scan signal line STN, a drain of the initialization switch T6 is connected to an initialization signal line Vinit, a source of the initialization switch T6 is connected to the anode of the light-emitting diode LED and the other terminal of the capacitor Cst. Wherein, the initialization signal line Vinit is configured to input an initialization signal, and the seventh scan signal line STN inputs a seventh scan signal. The initialization switch T6 is configured to transmit the initialization signal to the anode of the light-emitting diode LED according to the seventh scan signal, to realize initialization of the anode of the light-emitting diode LED, while realizing initialization of the gate of the driving transistor T2 through the capacitor Cst.

One terminal of the capacitor Cst is connected to the gate of the driving transistor T2 and the first switch T51, and the other terminal of the capacitor Cst is connected to the source of the initialization switch T6 and the anode of the light-emitting diode LED.

A previous frame F1 sequentially includes an initialization phase, a threshold voltage compensation and data writing phase, and a light-emitting phase.

During the initialization phase, the seventh scan signal line STN inputs the seventh scan signal at a high electrical level, and the initialization switch T6 conducts. The first light-emitting control signal line EM1 inputs the first light-emitting control signal at the high electrical level, and the second light-emitting control transistor T1 conducts. The fifth scan signal line SCAN5A inputs the fifth scan signal at the high electrical level, and the first switch T51 conducts. The sixth scan signal line SCAN5B inputs the sixth scan signal at the high electrical level, and the second switch T52 conducts. The second light-emitting control signal line EM2 inputs the second light-emitting control signal at a low electrical level, and the first light-emitting control transistor T3 cuts off. The fourth scan signal line SCAN4 inputs the fourth scan signal at the low level, and the writing switch T4 cuts off. The conducting initialization switch T6 transmits the initialization signal to the anode of the light-emitting diode LED. The conducting first switch T51 and the conducting second switch T52 in combination with the capacitor Cst realize initialization of the gate of the driving transistor T2.

During the threshold voltage compensation and data writing phase, the first switch T51, the second switch T52, the initialization switch T6, and the writing switch T4 all conducts. The conducting first switch T51 and the conducting second switch T52 make the drain of the driving transistor T2 and the gate of the driving transistor T2 electrically connected. The writing switch T4 writes in the data signal input by the data signal line DATA to the source of the driving transistor T2. The conducting initialization switch T6 facilitates further initialization of the anode of the light-emitting diode LED, preventing the terminal of the capacitor that connects to the light-emitting diode LED from being floating when the gate of the driving transistor T2 is written a voltage, which leads to unstable voltage of the anode of the light-emitting diode LED and abnormal luminescence of the light-emitting diode.

During the light-emitting phase, the first light-emitting control transistor T3, the second light-emitting control transistor T1, and the driving transistor T2 all conducts, the driving current output by the driving transistor T2 is transmitted to the light-emitting diode LED through the conducting first light-emitting control transistor T3, and the light-emitting diode LED emits light. The first switch T51 is in a conducting state, and the second switch T52 is in a cut-off state. The initialization switch T6 and the writing switch T4 are in a cut-off state.

In the previous frame, the first switch T51 is in the constant conducting state. In the previous frame, the second switch T52 is in a conducting state during the initialization phase and the threshold voltage compensation and data writing phase, and in a cut-off state during the rest of the frame, that is, the second switch T52 is in the conducting-and-cut-off switching state, as described above, a conducting time duration is far less than a cut-off time duration in a frame. The first switch T51 is under the effect of positive-bias temperature stress in the previous frame, and the second switch T52 is mainly under the effect of negative-bias temperature stress in the previous frame.

A current frame F2 also sequentially includes the initialization phase, the threshold voltage compensation and data writing phase, and the light-emitting phase. Wherein, the first switch T51 and the second switch T52 exchange operation state. The first switch T51 is in the conducting-and-cut-off switching state in the current frame F2, the same as the second switch T52 being in the conducting-and-cut-off switching state in the previous frame. The second switch T52 is in the constant conducting state in the current frame. In the current frame, the first switch T51 is mainly under negative-bias temperature stress, making a threshold voltage drift of the first switch T51 due to positive-bias temperature stress in the previous frame resumes. In the current frame, the second switch T52 is under positive-bias temperature stress, making a threshold voltage drift of the second switch T52 due to negative-bias temperature stress in the previous frame resumes. Threshold voltage of the first switch T51 and the second switch T52 will not drift, increasing stability of the first switch T51 and the second switch T52, preventing the first switch T51 and the second switch T52 from electrical leakage due to a negative drift of threshold voltage when they are in a cut-off state, thereby preventing the gate of the driving transistor T2 from electrical leakage through the first switch T51 and the second switch T52 during the light-emitting phase, which would lead to low-frequency display failure.

The difference between the present embodiment and the first embodiment is in that the first switch T51 and the second switch T52 according to the present embodiment as a whole function as making electrical connection of the gate and the drain of the driving transistor T2, while the first switch T51 and the second switch T52 according to the first embodiment as a whole function as making the data signal write into the gate of the driving transistor T2. A common point of the present embodiment and the first embodiment is in that one of the first switch T51 or the second switch T52 is connected to the gate of the driving transistor T2, and the first switch T51 is in series with the second switch T52. It can be understood that invention thought of the present application applies not only to the 2T1C driving circuit according to the first embodiment and the 6T1C driving circuit according to the second embodiment, but also to other driving circuits, such as a 7T1C circuit, etc.

Figure 4A:
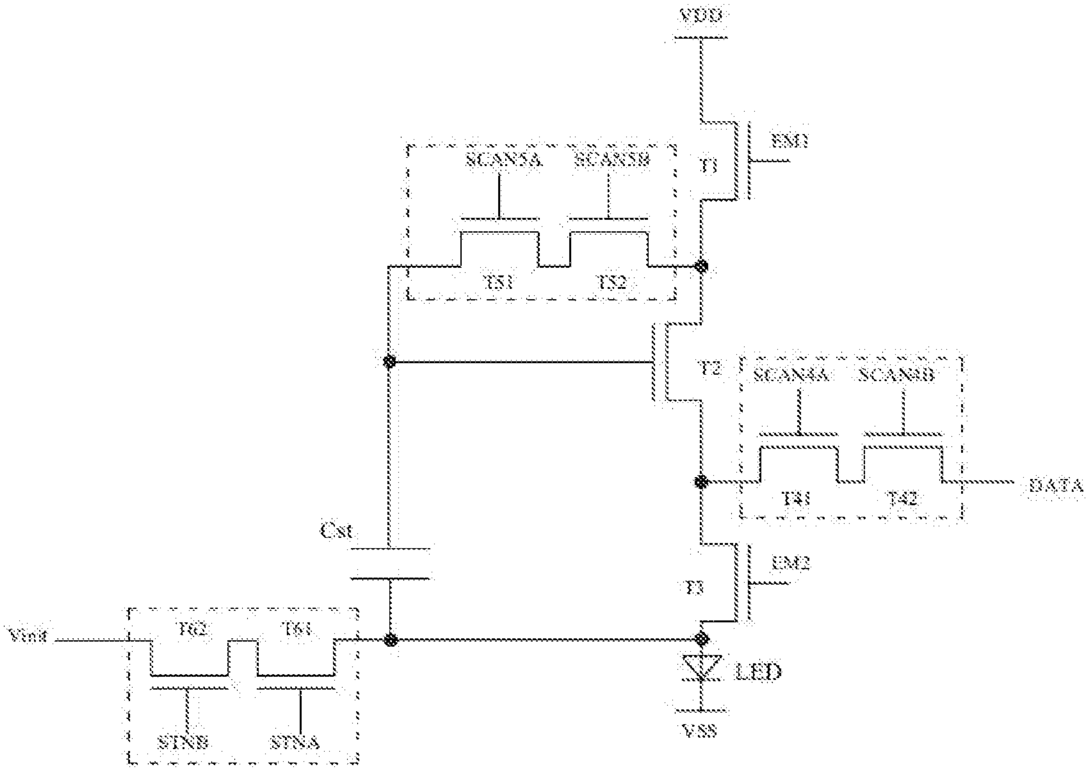
FIG. 4A is an equivalent circuit diagram of the driving circuit according to a third embodiment of the present application.
Figure 4B:
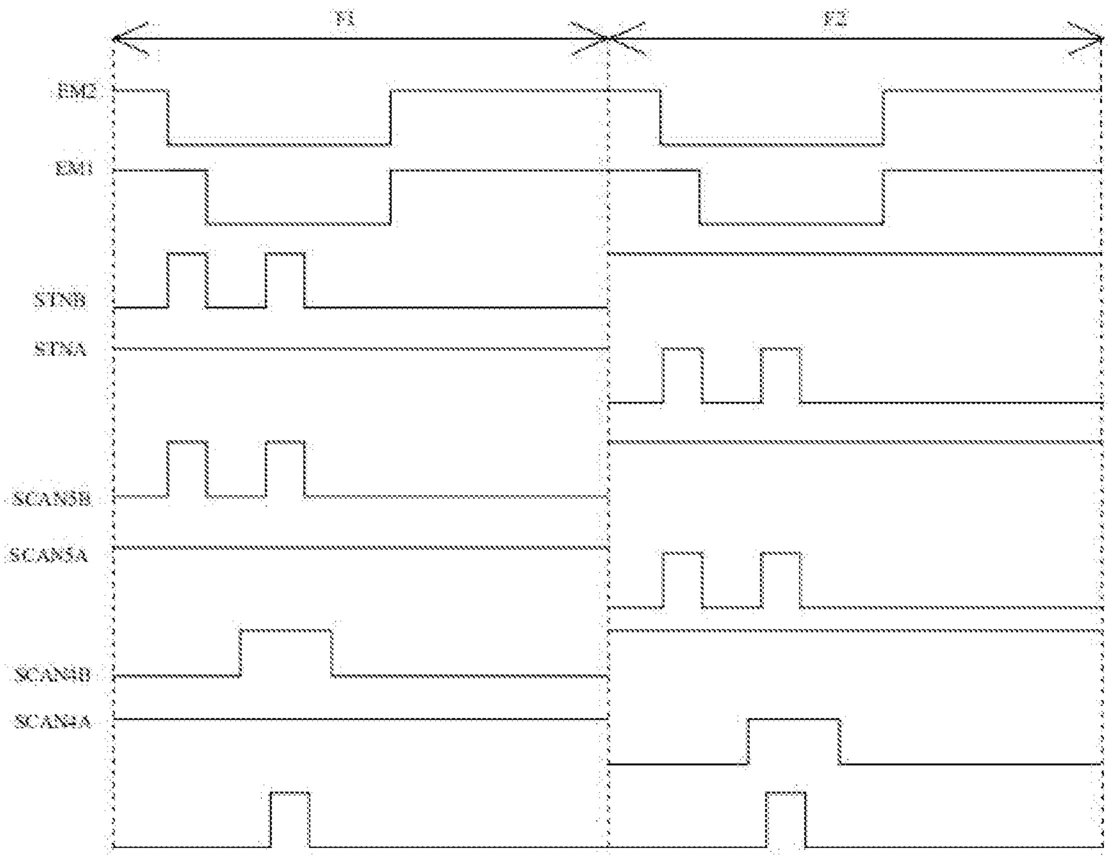
FIG. 4B is a timing diagram corresponding to the equivalent circuit diagram of the driving circuit according to the third embodiment of the present application.

Referring to FIG. 4A and FIG. 4B, FIG. 4A is an equivalent circuit diagram of the driving circuit according to a third embodiment of the present application. FIG. 4B is a timing diagram corresponding to the equivalent circuit diagram of the driving circuit according to the third embodiment of the present application. The driving circuit shown in FIG. 4A is basically the same as that shown in FIG. 3A, the difference is in that the initialization switch includes a first initialization switch T61 and a second initialization switch T62, and the first initialization switch T61 and the second initialization switch T62 both include a transistor having a metal oxide active layer. The writing switch includes a first writing switch T41 and a second writing switch T42, and the first writing switch T41 and the second writing switch T42 both include a transistor having a metal oxide active layer.

The first initialization switch T61 is connected to the anode of the light-emitting diode LED, being in the first state in the previous frame F1, and being in the second state in the current frame F2. The second initialization switch T62 is connected between the initialization signal line Vinit and the first initialization switch T61, being in the second state in the previous frame F1, and being in the first state in the current frame F2, and the first initialization switch T61 is connected between the second initialization switch T62 and the anode of the light-emitting diode LED. A gate of the first initialization switch T61 is connected to an eighth scan signal line STNA, and the eighth scan signal line STNA is configured to input an eighth scan signal. A gate of the second initialization switch T62 is connected to a ninth scan signal line STNB, and the ninth scan signal line STNB is configured to input a ninth scan signal. The second initialization switch T62 and the first initialization switch T61 are an n-type transistor.

The first initialization switch T61 and the second initialization switch T62 both include a transistor having a metal oxide active layer, preventing current of the anode of the light-emitting diode LED from flowing through the off-state first initialization switch T61 and the off-state second initialization switch T62, and preventing the light-emitting diode LED from a problem of ununiform brightness when displaying low greyscale.

As shown in FIG. 4B, in the previous frame F1, the eighth scan signal line STNA constantly inputs the eighth scan signal at a high electrical level, and the ninth scan signal line STNB alternately inputs the ninth scan signal with a high electrical level and a low electrical level. In the current frame F2, the eighth scan signal line STNA alternately inputs the eighth scan signal with the high electrical level and the low electrical level, and the ninth scan signal line STNB constantly inputs the ninth scan signal at the high electrical level.

The first initialization switch T61 is in the constantly conducting state in the previous frame F1, and in the conducting-and-cut-off switching state in the current frame (time duration of conducting state less than that of cut-off state). The first initialization switch T61 is under positive-bias temperature stress in the previous frame F1 and under negative-bias temperature stress in the current frame F2, making the first initialization switch T61 alternately under the effect of positive-bias temperature stress and negative-bias temperature stress, preventing threshold voltage of the first initialization switch T61 from drifting. The second initialization switch T62 is in the conducting-and-cut-off switching state in the previous frame F1, and in the constantly conducting state in the current frame F2. The second initialization switch T62 is under negative-bias temperature stress in the previous frame and under positive-bias temperature stress in the current frame, making the second initialization switch T62 alternately under the effect of positive-bias temperature stress and negative-bias temperature stress, preventing threshold voltage of the second initialization switch T62 from drifting. The first initialization switch T61 and the second initialization switch T62 have a stable performance when they are in an off state, preventing the first initialization switch T61 and the second initialization switch T62 from electrical leakage due to threshold voltage drift when they are turned off.

The first writing switch T41 is connected to one of the source or the drain of the driving transistor T2, being in the first state in the previous frame, and being in the second state in the current frame. The second writing switch T42 is connected between the first writing switch T41 and the data line DATA, being in the second state in the previous frame, and being in the first state in the current frame, and the first writing switch T41 is connected between the second writing switch T42 and one of the source or the drain of the driving transistor T2. A gate of the first writing switch T41 is connected to a tenth scan signal line SCAN4A, and the tenth scan signal line SCAN4A is configured to input a tenth scan signal. A gate of the second writing switch T42 is connected to an eleventh scan signal line SCAN4B, and the eleventh scan signal line SCAN4B is configured to input an eleventh scan signal. The first writing switch T41 and the second writing switch T42 are an n-type transistor. The first writing switch T41 is connected to the source of the driving transistor T2.

The first writing switch T41 and the second writing switch T42 both include a transistor having a metal oxide active layer, preventing electric potential of the source of the driving transistor T2 from electrical leakage through the off-state first writing switch T41 and second writing switch T42.

As shown in FIG. 4B, in the previous frame F1, the tenth scan signal line SCAN4A constantly inputs the tenth scan signal at a high electrical level, and the eleventh scan signal line SCAN4B inputs the eleventh scan signal at a high electrical level during part of the frame, while inputs the eleventh scan signal at a low electrical level during the rest of the frame. In the current frame F2, the tenth scan signal line SCAN4A inputs the tenth scan signal at the high electrical level during part of the frame, while inputs the tenth scan signal at the low electrical level during the rest of the frame, and the eleventh scan signal line SCAN4B constantly inputs the eleventh scan signal at the high electrical level.

The first writing switch T41 is in the constantly conducting state in the previous frame, and in the conducting-and-cut-off switching state in the current frame. The first writing switch T41 is alternately under the effect of positive-bias temperature stress and negative-bias temperature stress, preventing threshold voltage of the first writing switch T41 from negatively drifting. The second writing switch T42 is in the conducting-and-cut-off switching state in the previous frame, and in the constantly conducting state in the current frame. The second writing switch T42 is alternately under the effect of positive-bias temperature stress and negative-bias temperature stress, preventing threshold voltage of the second writing switch T41 from negatively drifting. The first writing switch T41 and the second writing switch T42 have a stable performance, preventing unstable electric potential of the source of the driving transistor T2.

It can be understood that, for a person of ordinary skill in the art, equivalent alteration or changes can be made according to technical approaches and invention thought of the present application, and all the changes or alteration is within the scope protected by appended claims of the present application.

What is claimed is:

1. A driving circuit, comprising:
- a light-emitting diode;
- a driving transistor electrically connected to the light-emitting diode and configured to provide driving current to the light-emitting diode;
- a first switch connected to a gate of the driving transistor, wherein the first switch is in a first state during a previous frame, and is in a second state during a current frame; and
- a second switch, wherein the first switch is connected between the gate of the driving transistor and the second switch, and the second switch is in the second state during the previous frame, and is in the first state during the current frame;
- wherein the first state is one of a conducting-and-cut-off switching state or a constant conducting state, and the second state is the other of the conducting-and-cut-off switching state or the constant conducting state.

2. The driving circuit as claimed in claim 1, wherein the first switch and the second switch both comprise a transistor with a metal oxide active layer.

3. The driving circuit as claimed in claim 1, further comprising:
- a first initialization switch connected to an anode of the light-emitting diode, wherein the first initialization switch is in the first state during the previous frame, and is in the second state during the current frame; and
- a second initialization switch connected between an initialization signal line and the first initialization switch, wherein the first initialization switch is connected between the second initialization switch and the anode of the light-emitting diode, and the second initialization switch is in the second state during the previous frame, and is in the first state during the current frame.

4. The driving circuit as claimed in claim 3, wherein the first initialization switch and the second initialization switch both comprise a transistor with a metal oxide active layer.

5. The driving circuit as claimed in claim 3, further comprising a capacitor, wherein one terminal of the capacitor is connected to the gate of the driving transistor, and the other terminal of the capacitor is connected to the anode of the light-emitting diode and the first initialization switch.

6. The driving circuit as claimed in claim 1, further comprising:
- a first writing switch connected to one of a source or a drain of the driving transistor, wherein the first writing switch is in the first state during the previous frame, and is in the second state during the current frame; and
- a second writing switch connected between the first writing switch and a data line, wherein the first writing switch is connected between the second writing switch and one of the source or the drain of the driving transistor, and the second writing switch is in the second state during the previous frame, and is in the first state during the current frame.

7. The driving circuit as claimed in claim 6, wherein the first writing switch and the second writing switch both comprise a transistor with a metal oxide active layer.

8. The driving circuit as claimed in claim 6, wherein the second switch is connected between the first switch and the other of the source and the drain of the driving transistor.

9. The driving circuit as claimed in claim 1, further comprising:
- a first light-emitting control transistor connected between one of a source or a drain of the driving transistor and an anode of the light-emitting diode; and
- a second light-emitting control transistor connected between the other of the source or the drain of the driving transistor and a power signal line.

10. The driving circuit as claimed in claim 9, wherein the driving transistor, the first light-emitting control transistor, and the second light-emitting control transistor are a transistor with a poly-silicon active layer.

11. The driving circuit as claimed in claim 1, wherein the second switch is connected between a data line and the first switch.

12. The driving circuit as claimed in claim 1, wherein the conducting-and-cut-off switching state includes a conducting state and a cut-off state, and a time duration of the conducting state is less than a time duration of the cut-off state in the conducting-and-cut-off switching state.

13. A driving method of a driving circuit, the driving circuit comprising:
- a light-emitting diode;

a driving transistor electrically connected to the light-emitting diode and configured to provide driving current to the light-emitting diode;

a first switch connected to a gate of the driving transistor, wherein the first switch is in a first state during a previous frame, and is in a second state during a current frame; and a second switch, wherein the first switch is connected between the gate of the driving transistor and the second switch, and the second switch is in the second state during the previous frame, and is in the first state during the current frame; wherein the first state is one of a conducting-and-cut-off switching state or a constant conducting state, and the second state is the other of the conducting-and-cut-off switching state or the constant conducting state, the driving method comprising following steps:

during the previous frame, the first switch being in the first state, and the second switch being in the second state; and during the current frame, the first switch being in the second state, and the second switch being in the first state.

14. A display device, comprising a driving circuit, wherein the driving circuit comprises:

a light-emitting diode;

a driving transistor electrically connected to the light-emitting diode and configured to provide driving current to the light-emitting diode;

a first switch connected to a gate of the driving transistor, wherein the first switch is in a first state during a previous frame, and is in a second state during a current frame; and a second switch, wherein the first switch is connected between the gate of the driving transistor and the second switch, and the second switch is in the second state during the previous frame, and is in the first state during the current frame;

wherein the first state is one of a conducting-and-cut-off switching state or a constant conducting state, and the second state is the other of the conducting-and-cut-off switching state or the constant conducting state.

15. The display device as claimed in claim 14, wherein the first switch and the second switch both comprise a transistor with a metal oxide active layer.

16. The display device as claimed in claim 14, wherein the second switch is connected between a data line and the first switch.

17. The display device as claimed in claim 14, wherein the driving circuit further comprises:

a first writing switch connected to one of a source or a drain of the driving transistor, wherein the first writing switch is in the first state during the previous frame, and is in the second state during the current frame; and a second writing switch connected between the first writing switch and a data line, wherein the first writing switch is connected between the second writing switch and one of the source or the drain of the driving transistor, and the second writing switch is in the second state during the previous frame, and is in the first state during the current frame.

18. The display device as claimed in claim 17, wherein the first writing switch and the second writing switch both comprise a transistor with a metal oxide active layer.

19. The display device as claimed in claim 17, wherein the second switch is connected between the first switch and the other of the source and the drain of the driving transistor.

20. The display device as claimed in claim 14, wherein the conducting-and-cut-off switching state includes a conducting state and a cut-off state, and a time duration of the conducting state is less than a time duration of the cut-off state in the conducting-and-cut-off switching state.

* * * * *